J. A. FOX & T. F. COTTRELL.
Tether.
No. 215,730.  Patented May 27, 1879.
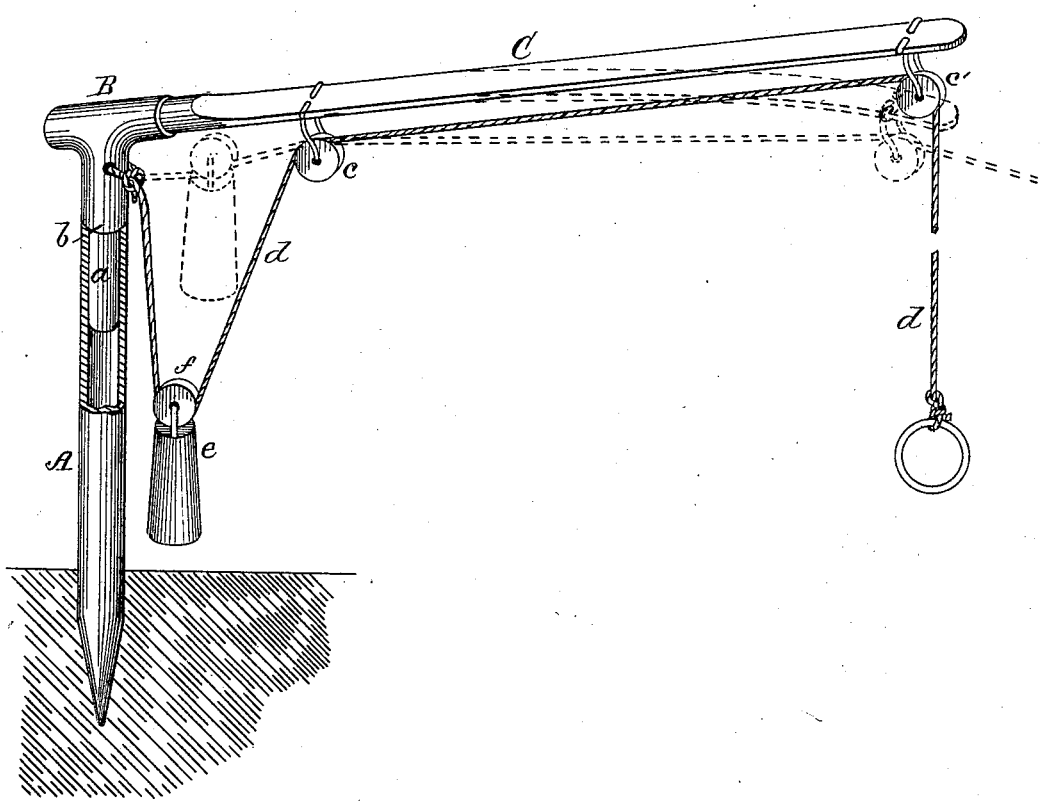

UNITED STATES PATENT OFFICE.

JAMES A. FOX AND THOMAS F. COTTRELL, OF NEWFANE, NEW YORK; SAID FOX ASSIGNOR TO VARNEY B. GASKILL, OF SAME PLACE.

IMPROVEMENT IN TETHERS.

Specification forming part of Letters Patent No. 215,730, dated May 27, 1879; application filed April 9, 1879.

*To all whom it may concern:*

Be it known that we, JAMES A. FOX and THOMAS F. COTTRELL, of Newfane, in the county of Niagara and State of New York, have invented a new and valuable Improvement in Tethers; and we do hereby declare that the following is a full, clear, and exact description of the construction and operation of the same, reference being had to the annexed drawing, making a part of this specification, and to the letters and figures of reference marked thereon.

The drawing is a representation of a perspective view of our invention, partly in section.

This invention has relation to that class of tethers for confining animals to a certain limit while feeding or grazing, consisting of a pole secured to a stake, and provided with a weight, cord, and pulleys.

The object of the present invention is to provide a tether with a spring-pole to prevent injury to the animal caused by any sudden pull or jerk upon the rope to which the animal is secured, and also rendering the tether simple in construction, possessing the required strength and durability, and reducing the cost in the manufacture.

The general construction of the tether is hereinafter described, and subsequently pointed out in the claim.

In the accompanying drawing, A represents a hollow pointed stake, preferably of metal, to be secured in the ground in an upright position. A socket-head, B, is formed with a shank, $a$, and shoulder $b$, said shank fitting in the upper end of the hollow stake A, and the shoulder $b$ resting upon the rim of the hollow stake to support the head B in and upon the stake to support the end of the same, and allow it to turn freely upon its axis.

To the head B is secured one end of a pole, C, said pole having secured to its under side pulleys $c\ c'$, over which passes a cord or rope, $d$, one end being secured to the head B. Between the post or stake A and pulley $c$ is a weight, $e$, provided with a pulley, $f$, to receive the cord or rope $d$.

The pole C is of wood, preferably of hickory or other wood having the required spring or elasticity, and is flattened upon its sides to increase its action as a spring, thereby forming or obtaining a perfect spring-pole that will readily yield to any sudden jerk upon the rope or cord by the animal, and avoid the danger of injuring him, as would be frequently the case in tethers having a non-elastic or rigid pole, or those poles pivoted to the stake.

As young colts are in the habit of pulling on their halters where they are put out to graze, the spring-pole will be found of great importance in avoiding injury to the colt when pulling upon the cord, while at the same time it has freedom to walk or graze about the tether-stake, the weight keeping the cord or rope taut, and preventing the animal from becoming entangled.

Having now fully described our invention, what we claim as new, and desire to secure by Letters Patent, is—

The combination of the hollow post or stake A, head B, having the shank $a$ and the shoulder $b$, with the spring-pole C, cord $d$, pulleys $c\ c'$, and weight $e$, all arranged substantially as and for the purpose set forth.

In testimony that we claim the above we have hereunto subscribed our names in the presence of two witnesses.

JAMES ASAHEL FOX.
THOMAS FRANK COTTRELL.

Witnesses:
D. R. MAXWELL,
ALLEN McCOLLUM.